United States Patent
Ovnic et al.

(10) Patent No.: US 9,636,721 B2
(45) Date of Patent: May 2, 2017

(54) METHOD AND CLEAN-IN-PLACE SYSTEM FOR CONVEYING TUBES

(71) Applicant: Quickdraft, Inc., Canton, OH (US)

(72) Inventors: Joseph M. Ovnic, Canton, OH (US); Kenneth J. Erskine, Chapel Hill, TN (US); Robert Prachar, Akron, OH (US); Michael R. Webb, Navarre, OH (US); Christopher L. Tokarcik, Mogadore, OH (US)

(73) Assignee: Quickdraft, Inc., Canton, OH (US)

( * ) Notice: Subject to any disclaimer, the term of this patent is extended or adjusted under 35 U.S.C. 154(b) by 56 days.

(21) Appl. No.: 14/688,750

(22) Filed: Apr. 16, 2015

(65) Prior Publication Data

US 2015/0298181 A1 Oct. 22, 2015

Related U.S. Application Data

(60) Provisional application No. 61/980,399, filed on Apr. 16, 2014.

(51) Int. Cl.
| | |
|---|---|
| *B08B 9/02* | (2006.01) |
| *B08B 9/055* | (2006.01) |
| *B08B 9/057* | (2006.01) |
| *F16L 55/46* | (2006.01) |
| *F16L 101/12* | (2006.01) |

(52) U.S. Cl.
CPC .......... *B08B 9/055* (2013.01); *B08B 9/0551* (2013.01); *B08B 9/0556* (2013.01); *B08B 9/057* (2013.01); *F16L 55/46* (2013.01); *F16L 2101/12* (2013.01)

(58) Field of Classification Search
None
See application file for complete search history.

(56) References Cited

U.S. PATENT DOCUMENTS

| | | |
|---|---|---|
| 5,300,151 A | 4/1994 | Lowther |
| 5,300,152 A | 4/1994 | Lowther |
| 5,419,138 A | 5/1995 | Anderson et al. |
| 5,548,960 A | 8/1996 | Anderson et al. |
| 5,685,041 A | 11/1997 | Sivacoe |
| 5,795,402 A | 8/1998 | Hargett, Sr. et al. |
| 5,903,945 A | 5/1999 | Lundie |
| 5,924,158 A | 7/1999 | Watts |
| 6,038,725 A | 3/2000 | Knapp |
| 6,041,811 A | 3/2000 | Walter et al. |
| 6,079,074 A | 6/2000 | Ellett |
| 6,263,534 B1 | 7/2001 | McCann et al. |
| 6,315,639 B1 | 11/2001 | Kipp |
| 6,402,854 B1 | 6/2002 | Horridge |
| 6,409,843 B1 | 6/2002 | Ellett |
| 6,468,360 B1 | 10/2002 | Andrews |

(Continued)

FOREIGN PATENT DOCUMENTS

| | | |
|---|---|---|
| EP | 0490117 A1 | 6/1992 |
| WO | 04000475 A1 | 12/2003 |

*Primary Examiner* — Michael Kornakov
*Assistant Examiner* — Ryan Coleman
(74) *Attorney, Agent, or Firm* — Zollinger & Burleson Ltd.

(57) ABSTRACT

A clean-in-place system for piping systems uses a pig train having a dry ice and glycol section. The pig train is moved through the piping system as part of a cleaning sequence. The system and method of the disclosure provide an alternative, effective clean-in-place system that significantly reduces water, chemical and energy usage as well as significantly reducing the related environmental impact.

25 Claims, 8 Drawing Sheets

(56) References Cited

U.S. PATENT DOCUMENTS

| | | |
|---|---|---|
| 6,485,577 B1 | 11/2002 | Kiholm |
| 6,502,270 B2 | 1/2003 | Rinne |
| 6,916,383 B2 | 7/2005 | Quarini |
| 7,140,954 B2 | 11/2006 | Johnson et al. |
| 7,247,210 B2 | 7/2007 | Staub et al. |
| 7,380,557 B2 | 6/2008 | Shiraishi |
| 7,897,115 B2 | 3/2011 | Adams |
| 8,480,788 B2 | 7/2013 | Balk |
| 8,603,262 B2 | 12/2013 | Lambert |
| 2002/0082179 A1 | 6/2002 | Okazawa et al. |
| 2004/0091390 A1 | 5/2004 | Bentley |
| 2005/0183744 A1 | 8/2005 | Staub et al. |
| 2008/0302388 A1 | 12/2008 | Johns et al. |
| 2009/0277473 A1 | 11/2009 | Boggs |
| 2011/0150711 A1 | 6/2011 | Adams |
| 2011/0232683 A1 | 9/2011 | Matthews et al. |
| 2012/0066841 A1 | 3/2012 | Matthews et al. |
| 2012/0097192 A1 | 4/2012 | Crawford et al. |
| 2013/0263890 A1 | 10/2013 | Masserant |
| 2013/0276828 A1 | 10/2013 | Phipps et al. |
| 2014/0053404 A1 | 2/2014 | Johnson et al. |

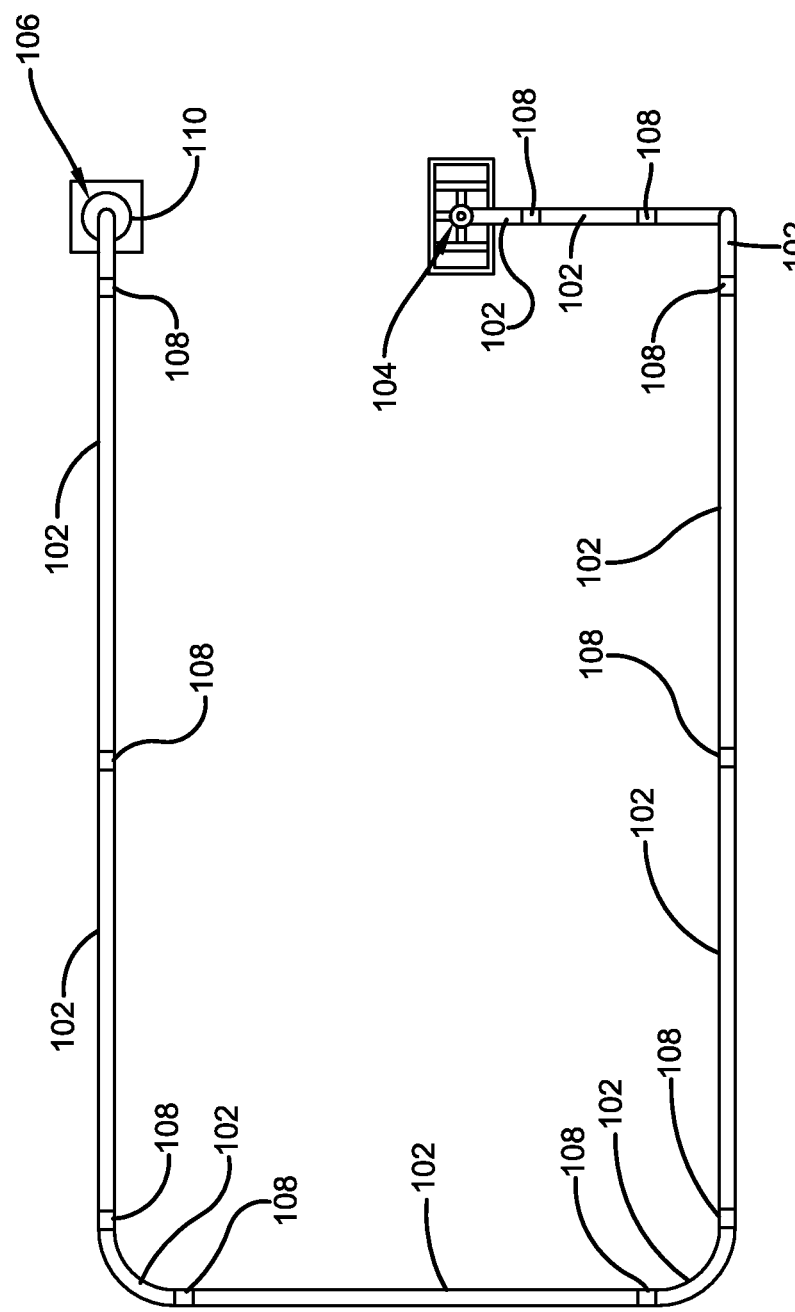

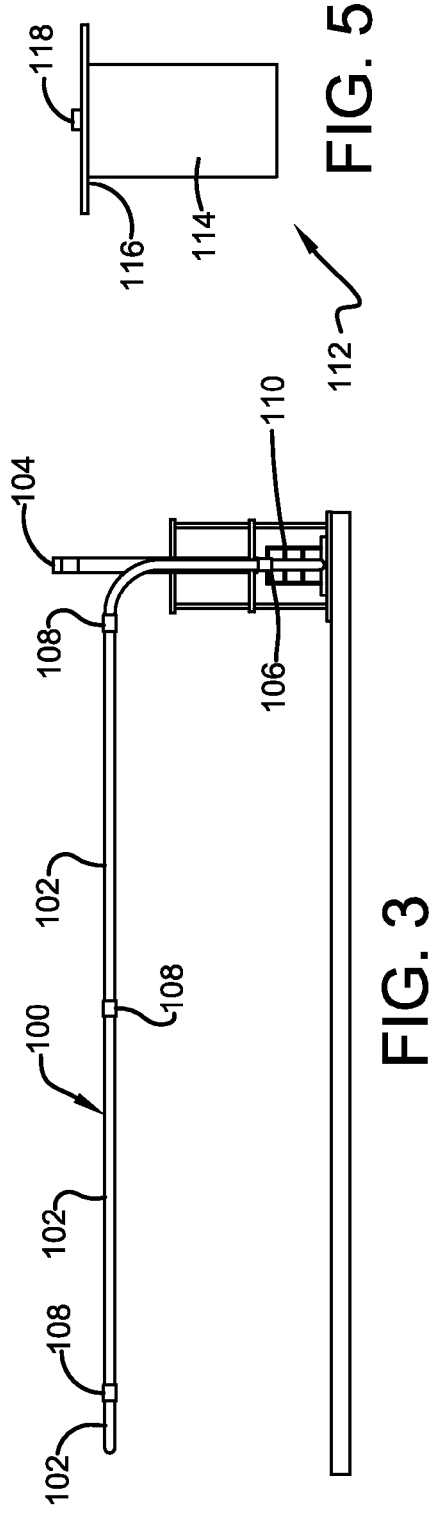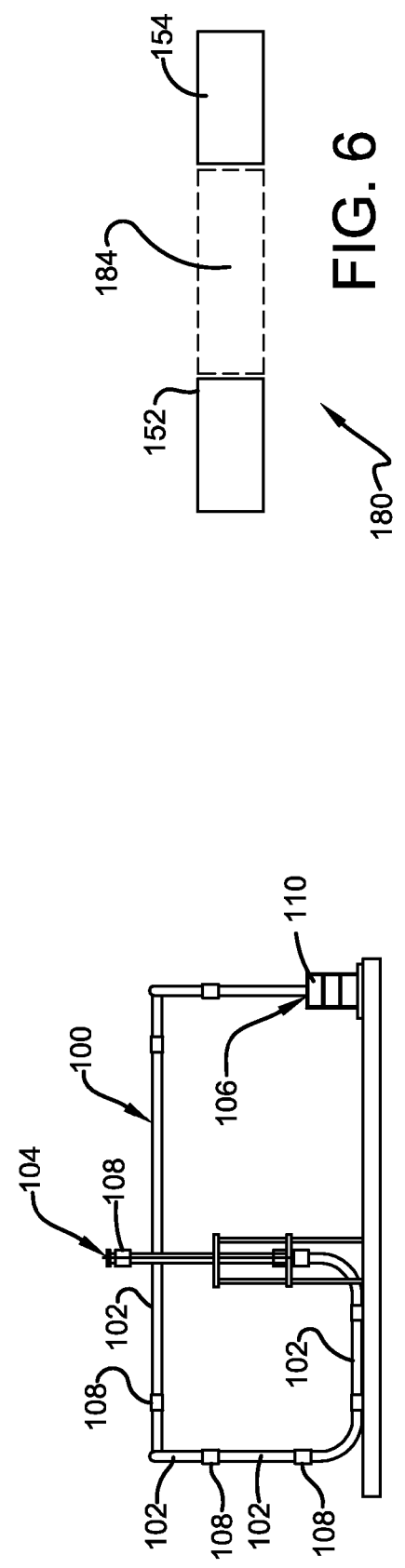

METHOD AND CLEAN-IN-PLACE SYSTEM FOR CONVEYING TUBES

CROSS REFERENCE TO RELATED APPLICATIONS

This application claims the benefit of U.S. Provisional Patent Application Ser. No. 61/980,399 filed Apr. 16, 2014; the disclosures of which are incorporated herein by reference.

BACKGROUND OF THE DISCLOSURE

1. Technical Field

The disclosure generally relates to systems and methods for cleaning the inner surfaces of conveying tubes, piping, or ducts and, more particularly, to systems and methods for cleaning tubes, piping, or ducts using a flexible pig train that engages the inner surfaces of the tubes, piping, or ducts to remove debris. Specifically, one configuration of the system and method uses a pig train that includes a portion formed from the combination of dry ice and glycol.

2. Background Information

Conventional clean-in-place (CIP) systems and methods that are used to clean conveying tubes, pipes, or ducts to a microbiological level require copious amounts of water and chemicals which must be stored, heated to temperatures in excess of 135° F., and pumped through the tubes at a high velocity in order to create the shear forces required to scour the tube walls. The polluted waste water and chemicals then must be discharged to a waste water system for treatment. Conveying tubes used to move food products are cleaned in this manner.

Other clean-in-place systems use a pig as an instrument to flush or purge a piping system. U.S. Pat. No. 6,485,577 discloses a pig and pig launching chamber where the pig is frozen and formed from at least a component of the product stream. Another pig formed from crushed ice is disclosed in U.S. Pat. No. 6,916,383.

SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The system and method of the disclosure provide an alternative, effective CIP system that significantly reduces water, chemical and energy usage as well as significantly reducing the related environmental impact of the conventional CIP system requirements for water and chemical disposal. The CIP system and method described in this application can be used to clean a wide variety of piping systems. Existing piping systems can be retrofit with a pig train loader, a pig train unloader, and compressed air fittings to form this CIP system which allows the CIP method described herein to be performed.

The disclosure provides a method for cleaning a tube that includes the step of moving a dry ice and glycol pig train through the tube. The disclosure also provides a method for cleaning and sanitizing a tube the includes the steps of moving a dry ice and glycol pig train through the tube followed by a pig train that includes water and a sanitizing agent. These steps can be repeated multiple times and additional steps of flushing with a clean water pig train can be added between steps.

The system and method of the disclosure are used with pipes, tubes, and ducts for conveying edible and non-edible food products including but not limited to white meats, red meats, pastes, sauces, cereals, vegetables, fruits, dairy, and also cosmetics and pharmaceuticals. Edible food conveying piping systems must be cleaned to a microbiological level.

The system and method of the disclosure provide a pig train configuration that includes solid carbon dioxide particles in combination with glycol. The pig train includes leading and trailing pig members disposed in front of and behind the mixture of carbon dioxide particles and glycol. The leading and trailing pig members are formed from a food grade polymer. The dry ice agitates the glycol as the pig train is moved through a piping system. The agitation of the dry ice particles and the glycol helps clean the inner surface of the tubes. The pig train may be pushed with compressed air, pulled with a vacuum, or pushed with hydraulic force. The pig train also can be driven mechanically such as being self driven with powered roller or tracks, pushed with a ram, or pulled with a cable.

The disclosure provides one configuration for cleaning and sanitizing a tube with a first step of moving a dry ice and glycol pig train through the tube. The pig train includes the dry ice and glycol combination disposed between leading and trailing food grade plastic pigs. The volume of the dry ice and glycol varies with the application. For example, a dry ice and glycol slug of five to fifteen feet has been found to be functional for a six inch diameter tube. This pig train as well as the other pig trains described below are moved through the piping system with compressed air having a pressure between 30 and 200 pounds per square inch (psi). This first step brings the agitated dry ice and glycol solution into contact with the interior of the tube and forces a scrubbing action along the interior of the tube sections. The first step can be repeated multiple times. This first step is followed by a flushing step in which a slug of water disposed between leading and trailing pigs is moved through the tube. A next step moves a slug formed of a mixture of hot water and a caustic material that is again disposed between pigs. This step can be repeated multiple times as needed with or without the clean water flush between and/or after iterations. The final step is the movement through the tube of a slug of an acid water sanitizing solution contained between two pigs. Using the leading and trailing pigs reduces the volume of components used in the different steps because the entire piping system does not have to be filled to bring the materials into contact with the tube wall. The initial pass or passes of the dry ice and glycol slug provides a scrubbing function for the tube wall.

The disclosure provides several pig loading apparatus and a pig unloading apparatus. Two of the pig loading apparatus are configured for automated or partially-automated operation of the cleaning system.

Individual features of the disclosure may be combined to form additional combinations.

BRIEF DESCRIPTION OF THE DRAWINGS

FIG. 2 is a top plan view of the system of FIG. 1.

FIG. 3 is a front elevation view of the system of FIG. 1.

FIG. 4 is a right side elevation view of the system of FIG. 1.

FIG. 5 is a side view of an end cap that is used to close the piping system behind a pig in one exemplary configuration.

FIG. 6 is a side view of a pig train used to clean the interior surface of the piping system.

Similar numbers refer to similar parts throughout the specification.

DETAILED DESCRIPTION OF THE DISCLOSURE

Figure 1:
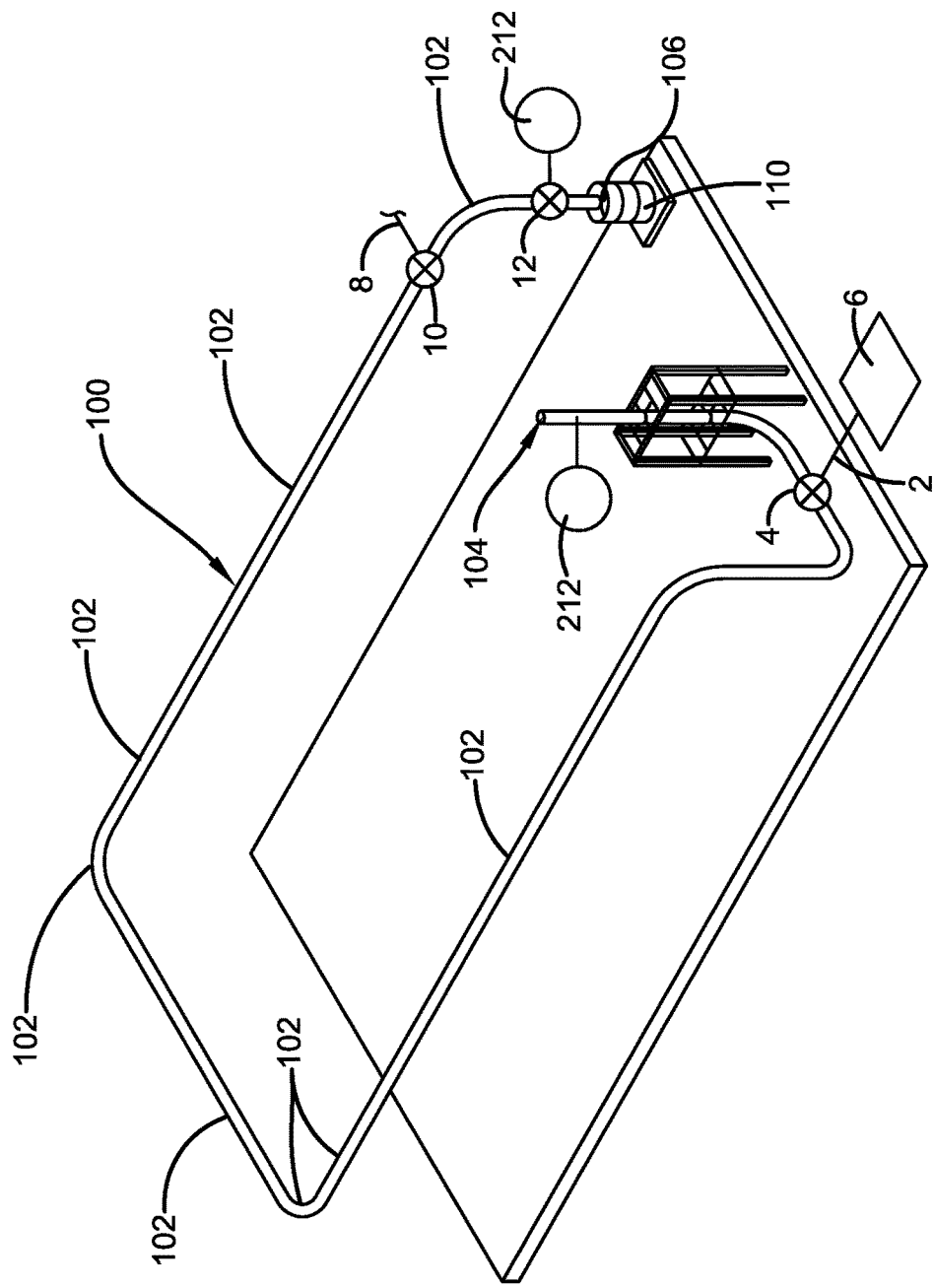
FIG. 1 is a perspective view of an exemplary piping system that can be cleaned with the pigs and method of this disclosure.

The disclosure provides different embodiments of a conveying piping system having clean-in-place components and a clean-in-place method used to clean the interior of a conveying piping system. The elements or portions of the piping system are referred to as tubes, tube sections, or ducts in this description. The interior surface is referred to as a tube wall. The system and method described herein is particularly useful for cleaning conveying piping systems used for a wide variety of materials including food and non-food-related products such as edible and non-edible food products including but not limited to white meats, red meats, pastes, sauces, cereals, vegetables, fruits, dairy, and also cosmetics and pharmaceuticals. These conveying piping systems often must be cleaned to a microbiological level.

An exemplary piping system with the clean-in-place functionality described herein is indicated generally by the numeral 100 in the accompanying drawings. Piping system 100 can be part of a food or beverage processing facility, a pharmaceutical plant, or a chemical plant. Piping system 100 is typically used within these facilities to convey product from one location to another. Piping system 100 includes a plurality of individual tube sections 102 connected together to form a continuous conduit having at least one pig train inlet 104 and at least one pig train outlet 106. Pig train inlet 104 is the location where the pig trains described below are introduced into system 100. These locations can vary and be at a vertical tube section or a horizontal or angled tube section. Pig train outlet 106 is the location where the pig trains described below are removed from system 100. External compression clamps, compression couplings, sanitary flanges, or welded joints 108 are used to join tube sections 102 in the example of system 100 but other methods of joining the tubes sections 102 may be used. The arrangement of tube sections 102 in FIGS. 1-4 is exemplary and not limiting. The system and method of this disclosure may be used with a wide variety of system configurations including those that only include straight tube sections as well as those that include rises, falls, and turns. The system and method may be used with different tube diameters than described herein, different turn radii, different numbers and different configurations of corners, different tubing materials, and different tube lengths. The example depicts tube sections 102 having a six inch inner diameter disposed in a horizontal U with two legs about forty-six feet long and a base leg about twenty-six feet long (not counting the pig train loading and unloading areas).

These piping systems 100 are used to convey materials or product such as the exemplary materials described above. In order to introduce the materials into system 100, at least a single product inlet 2 (shown schematically in FIG. 1) is provided and, in other configurations, a plurality of inlets are provided. The inlet for the conveyed material can be the same as pig train inlet 104 but often are different from the pig train inlet 104. A valve 4 can be used to isolate the pig train inlet from product inlet 2 when product is being directed into system 100 from a supply of product 6. The conveyed material inlets 2 can be upstream or downstream of pig train inlet 104. System 100 includes at least one pig train outlet 106 but also may include a plurality of pig train outlets 106 controlled with a valve or valves that directs the flow in system 100 from one pig train outlet 106 to another pig train outlet 106 as desired by the operator. As with the inlets 2, pig train outlet 106 can be different from the outlet 8 of the system used to discharge the conveyed material or product. In some cases, the outlets 8 are the same. A valve 10 is used to isolate pig train outlet 106 when system 100 is in use and product is being discharged through outlet 8.

Pig train outlet 106 includes a pig catcher which functions to slow or stop the movement of the pig train. In one configuration, the pig catcher allows the pig train to be discharged from the tube into a discharge collection container 110. The operator can then remove the leading and trailing pig members from container 110 so they can be cleaned and used again. The other material caught in container 110 is disposed of according to environmental regulations. In another embodiment, the pig catcher is an area of enlarged tubing disposed at or near outlet 106. The enlarged tubing allows the compressed air to move around the pig train when the pig train is disposed in the enlarged tubing so that the pig train stops moving.

In some embodiments, pig train outlet 106 can be sealed with a cap or valve 12 so that compressed air may be introduced into the piping system from the outlet end. This allows a pig train to be stopped or moved back toward the inlet when such movement is desired. The introduction of compressed air from the outlet side also allows the pig train to be compressed with compressed air from both ends of the pig train while the pig train is disposed within the tubing. This squeezes the material between the leading and trailing pigs and forces it against the tube wall where the pig train is located.

In one configuration, when one of the pigs described below is placed into system 100, an end cap 112 (FIG. 5) is connected to the tube that defines inlet 104 and secured in place. End cap 112 includes a body 114 and a flange 116. A pneumatic connector 118 such as a threaded coupler or a biased snap connector extends through flange 116 to allow compressed air to be delivered into system 100 through flange 116. The pig may be moved with pressurized air that is delivered to system 100 through coupler 118. Body 114 is disposed along the interior surface of the end of the tube section 102 that defines inlet 104 and may frictionally engage the inner surface such that body 114 slides into place with essentially no gaps between the outer surface of body 114 and the inner surface of the tube section 102 that defines inlet 104. This configuration allows body 114 to be secured in place with a clamp 108 disposed on the exterior of the tube 102 that compresses the tube against body 114.

In the exemplary configuration, body 114 has a length that is longer than the tube diameter but less than twice the length of the tube diameter. In the exemplary configuration, body 114 is ten inches long. Body 114 may be solid or hollow as long as it defines a channel to deliver compressed air to system 100 through pneumatic connector 118. Flange 116 has a diameter larger than the inner diameter of the tube 102 that defines inlet 104 and may have a dimension that is larger than the exterior diameter of the tube 102 that defines inlet 104.

An exemplary pig train 180 is depicted in FIG. 6. Moving pig train 180 through system 100 provides an alternative to the method of flushing system 100 with high velocity water and chemicals until the interior walls are cleaned. In this configuration, pig train 180 includes leading 152 and trailing 154 pig members that define a gap between the rear of leading member 152 and the front of trailing member 154. Pig members 152 and 154 are fabricated from food grade polymer such as a food grade polyurethane. Each pig member 152 and 154 is sized to slide along the inner surface of the tube sections. Each pig member is flexible and has a diameter of about six inches to match the interior size of the tube. Each is about ten inches long. Each can frictionally engage the tube wall such the fit between the tube and the pig member is tight. Each pig member can be finned. Pig train 180 is formed when this gap between pig members 152 and 154 is substantially filled with dry ice and glycol or substantially filled with cleaning and sanitizing agents. In one configuration of the disclosure, the dry ice is added as a plurality of particles and the glycol is provided as a liquid. The glycol can be corn glycol. The corn glycol is food grade and has a low freezing point to allow pig train 180 to remain flexible as it is moved through system 100. The sublimation of the dry ice agitates the corn glycol and the dry ice particles to cause a scrubbing action against the tube walls as the pig train is moved. The sublimation increases the pressure of the material between the pig members and will drive the pig members apart. The gap may be ten to twenty times the diameter of tube 102 or as small as five times the diameter. Pig train 180 can be formed by inserting leading member 152 and moving it down into a tube section far enough to allow the dry ice and glycol to be added. Trailing member 154 is then inserted to trap the dry ice and glycol between both members 152 and 154.

The volume of the dry ice and corn glycol varies with the application. A dry ice and glycol length of five to fifteen feet has been found to be functional in this example. In each of the steps described herein, pig train 180 is moved through the tubing with compressed air having a pressure between 30 psi and 200 psi. This first step of the cleaning process may be repeated multiple times and running the first step two to five times provides desirable results. While the pig train is being moved through the system, the dry ice sublimates and the addition of the corn glycol to the dry ice accelerates the sublimation and agitates the glycol against the tube surface as pig train 180. The physical agitation is created from the gas bubbles. The sublimation generates pressure between the pig members 152 and 154 as they are moved through system 100. In some configurations, pig members 152 and 154 can be tethered together to further increase the pressure. In some configurations, the pressure is too high and venting holes are provided through one or both pig members 152 and 154 to allow the gas between pig members 152 and 154 to escape. These venting holes can be designed to only vent above set pressures or to vent slowly in order to maintain pressure between the pig members. In other applications the lead pig member 152 is free to move forward as the gas volume increases.

Pig train 180 may be slowed or stopped at a specific area of the tubes that requires additional or extra cleaning. Stopping pig train 180 provides additional time for that area of system 100 to be in contact with pig train 180. Compressed air can be applied to both the lead 152 and trailing 154 pig members to increase the pressure on the dry ice and glycol disposed in the gap between the pig members 152 and 154. This forces the cleaning agents against the tube walls. In addition to simply slowing or stopping pig train 180, the pig train 180 can be moved back and forth at the area by alternating the application of the compressed air.

The first step of using the dry ice and glycol is followed by a flushing step in which a slug of water disposed between leading 152 and trailing 154 pig members is moved through the tubing. This slug also may be five to fifteen feet in length. The next step is moving a slug of a fresh hot water and a disinfecting or sanitizing material (caustic soda, chlorine, choline-products, ammonia products, iodophors, and the like can be used) that is again disposed between pig members 152 and 154. The fresh hot water is initially between about 135 and about 150 degrees Fahrenheit depending upon the mixture of fresh water and chemicals. These steps—water flush and hot water and caustic flush—can be conducted once or can be repeated multiple times as additional steps of the method. In some configurations, the third step is repeated multiple times (two to ten times) without a fresh water rinse between each. After the final chemical flushing step is performed, a pig train of fresh water can be run through the system prior to the final step. The final step is the movement through the tube of a slug of water combined with an acid sanitizing solution contained between two pigs. Each of these steps uses fresh, clean pig members 152 and 154. This multiple stage process cleans the interior of the tubes to a microbiological level. The exact number of pig trains run through the system depends on the material which is conveyed with the system and the types of sanitizing or disinfecting chemicals being used. Each step requires only the volume of material between the pig members instead of filling the entire piping system with the material and moving it with sufficient velocity to scrub the tube wall. If the length of material between the pig members is ten feet and the length of the piping to clean is a hundred feet, the volume savings are significant if the same number of flushes are conducted.

An exemplary method includes at least two pig runs with a dry ice and glycol pig train. This initial step is followed by a fresh water flush using a pig train. A series of five or more cleaning runs with chlorinated water follows. A final fresh water flush is run before the final step of a pig train with a sanitizer.

Figure 7:
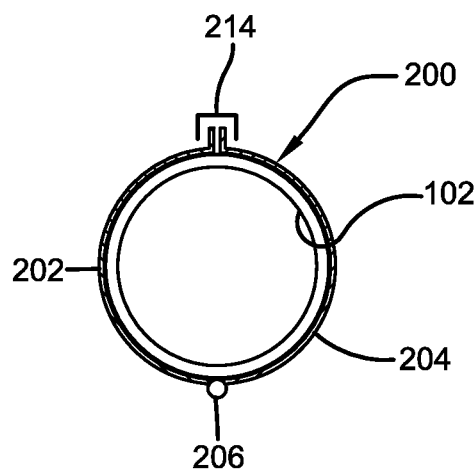
FIG. 7 is a sectional end view of a first configuration for a pig train loader with the loader closed.
Figure 8:
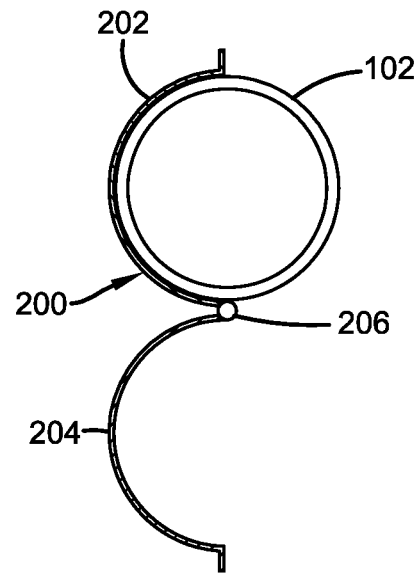
FIG. 8 is a sectional end view of the first configuration for a pig train loader with the loader open.
Figure 9:
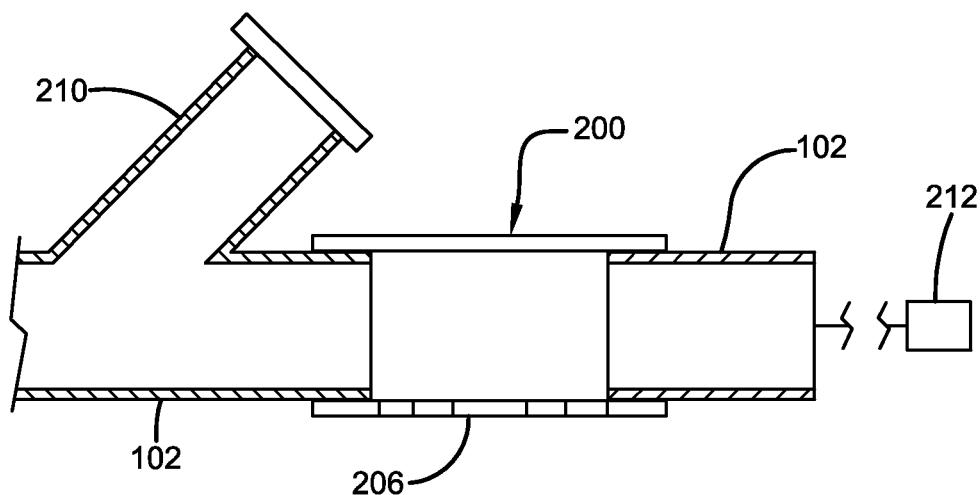
FIG. 9 is an elevation view of FIG. 7.

FIGS. 7-9 depict a first configuration for a manual pig loader. In this configuration, an outer sleeve 200 having at least first 202 and second 204 sections is aligned with a section of tubing 102. Sections 202 and 204 are connected with a hinge member 206 to allow at least second section 204 to be movable between closed and open configurations. In one configuration, the open condition of second section 204 allows pig members 152 and 154 and the dry ice and glycol to be added in alignment with tube 102. In another configuration, a loading inlet 210 is provided in a spaced location from outer sleeve 200. When loading inlet 210 is used, leading pig member 152 is inserted into tube section 102 and moved past inlet 210—which is to the left in FIG.

9. Trailing pig member 154 is added and spaced from leading pig member 152 the distance required for the desired slug of dry ice and glycol. Second section 204 of outer sleeve 200 is then closed and outer sleeve 200 is held closed with a clamp 214 or a plurality of clamps 214 (or locked in a sealed closed position). The dry ice and glycol are then added through inlet 210 to form pig train 180. The dry ice may be added first with the liquid glycol poured in just before inlet 210 is sealed and tube 102 is pressurized through a source of pressurized air 212 to move pig train 180 through piping system 100. In another configuration, a pair of outer sleeves 200 are provided to the left and right of inlet 210 so that both pig members 152 and 154 may be loaded at the same time. In this configuration, pig members 152 and 154 are loaded and outer sleeves 200 are closed before the dry ice and glycol is added to form pig train 180.

Figure 10:
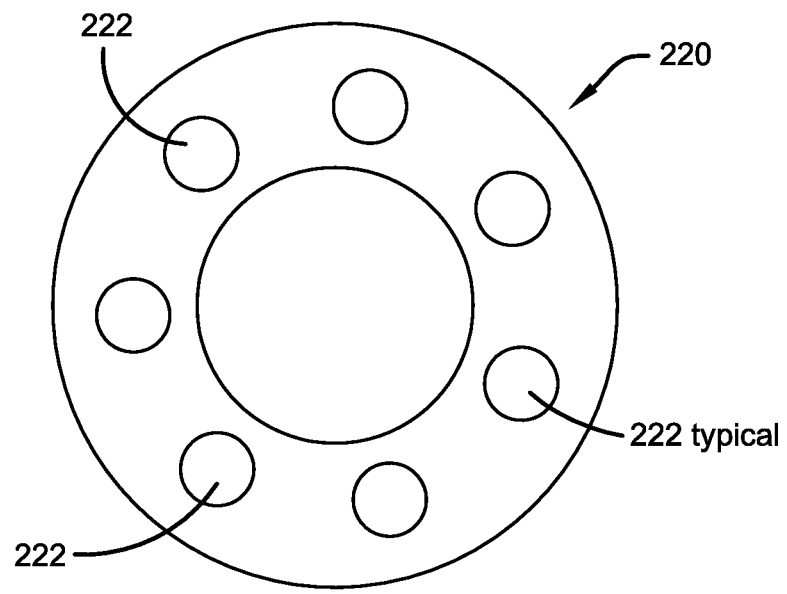
FIG. 10 is a schematic end view of a second configuration for a pig train loader that is adapted to be used in an automated system.
Figure 11:
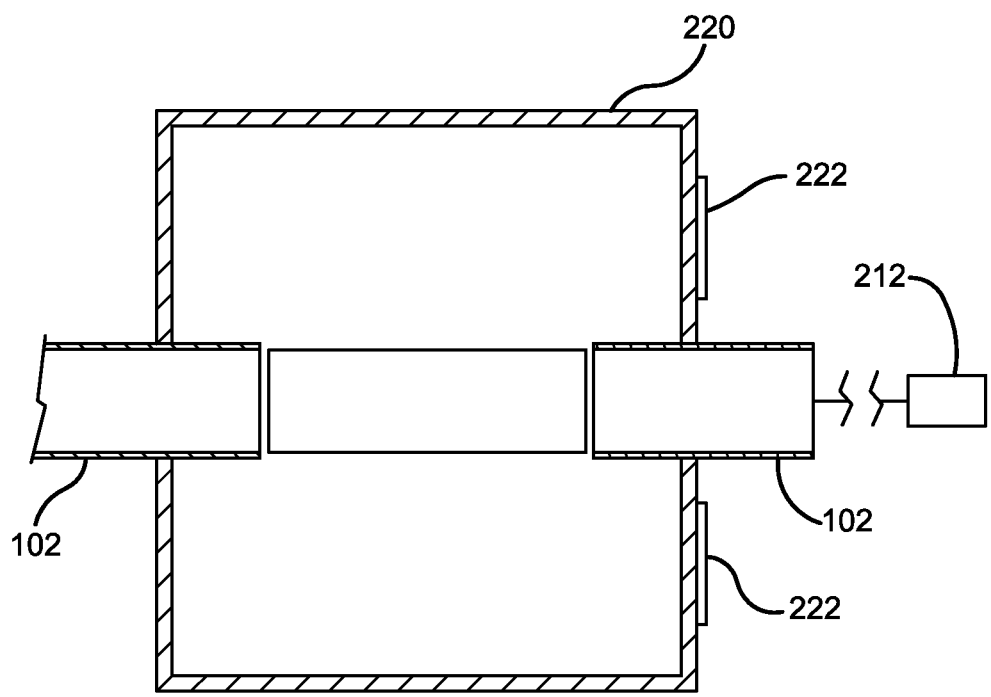
FIG. 11 is a schematic side view of FIG. 10.

FIGS. 10-11 schematically depict a configuration for an automated pig loader wherein the plurality of pig trains required for the cleaning of system 100 may be held so that each may be automatically launched as a pig loading cylinder 220 is rotated through the steps of the method. This configuration includes a pig loading cylinder 220 having a plurality of pig loading chambers 222 that are selectively moved into alignment with a tube section 102 of piping system 100 where the pig is launched by compressed air delivered from source 212. One chamber 222 may be provided for each step of the cleaning process or one extra chamber 222 may be provided to facilitate loading. The pig trains used with the steps described above may be formed directly in loading chambers 222 or in a separate pig train forming tube that allows the pig trains to be loaded into chambers 222. Pig train 180 is the first to be launched in the above method and it is formed last. The other required pig trains are disposed sequentially about cylinder 220 such that each can be launched after the one before it has passed through piping system 100.

Figure 12:
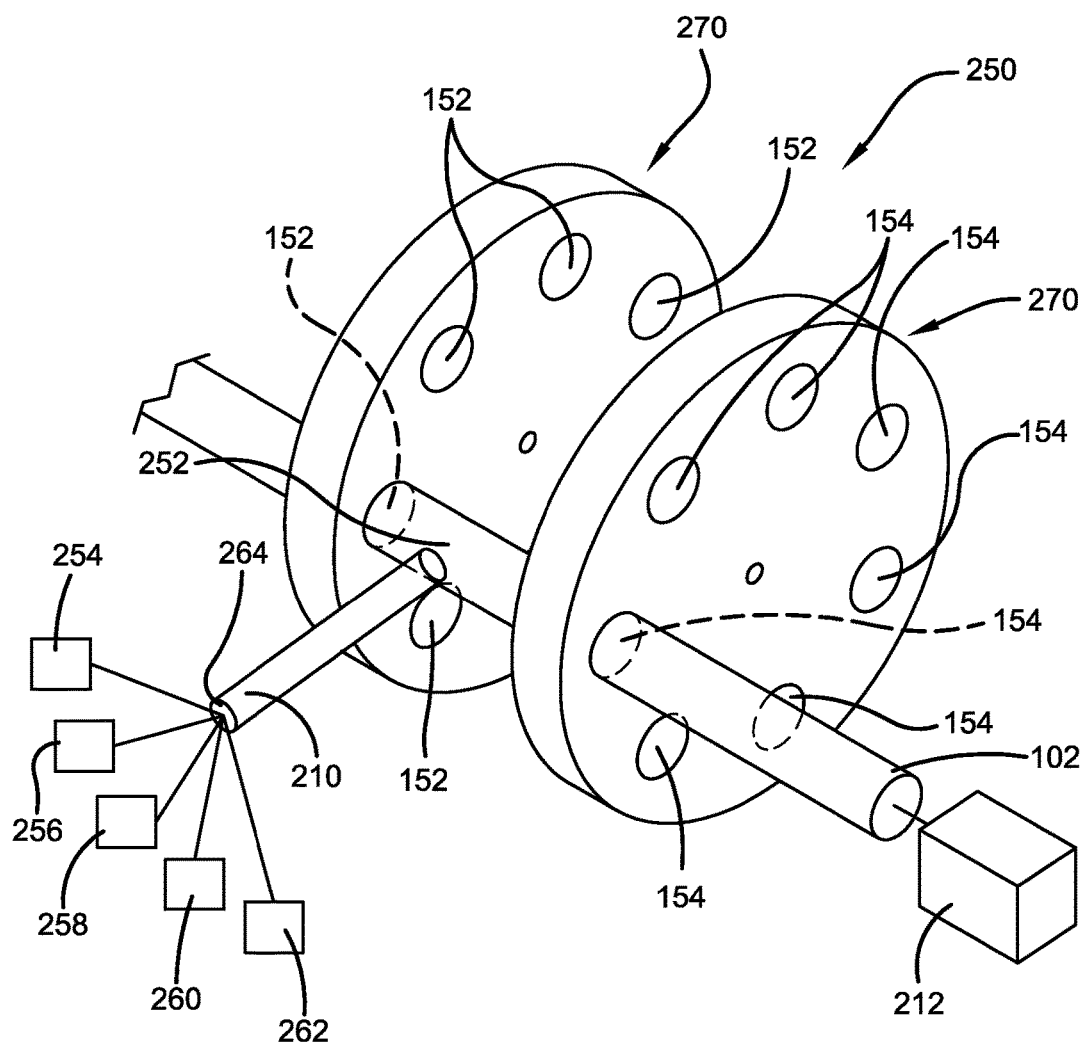
FIG. 12 is a schematic view of a third configuration for a pig train loader that is adapted to be used in an automated system.

Another automated pig train loader 250 is schematically depicted in FIG. 12. This configuration of automated loader 250 separately positions leading 152 and trailing 154 pig members to positions where they are aligned with tube section 102 and a mixing chamber 252. Mixing chamber 252 receives the material that is used between pig members 152 and 154 to form the pig train. Once pig members 152 and 154 are aligned and the material is added to form the pig train, compressed air 212 is used to push the pig train through tube section 102. After that pig train is moved through tube section 102, the next pig train is created and moved.

Mixing chamber 252 is fed with an inlet 210 that is in selective communication with sources of water 254, glycol 256, dry ice 258, chlorinated or caustic material 260, and the acid wash solution 262. A computer or digital controller 263 can be used to control the mixing of these components in mixing chamber 252 as they are needed by the method. A controllable valve 264 and appropriate pumps are used to control the addition of these materials to mixing chamber 252. In one configuration, the entire process is automated. In another configuration, one or more steps are performed manually.

Figure 14:
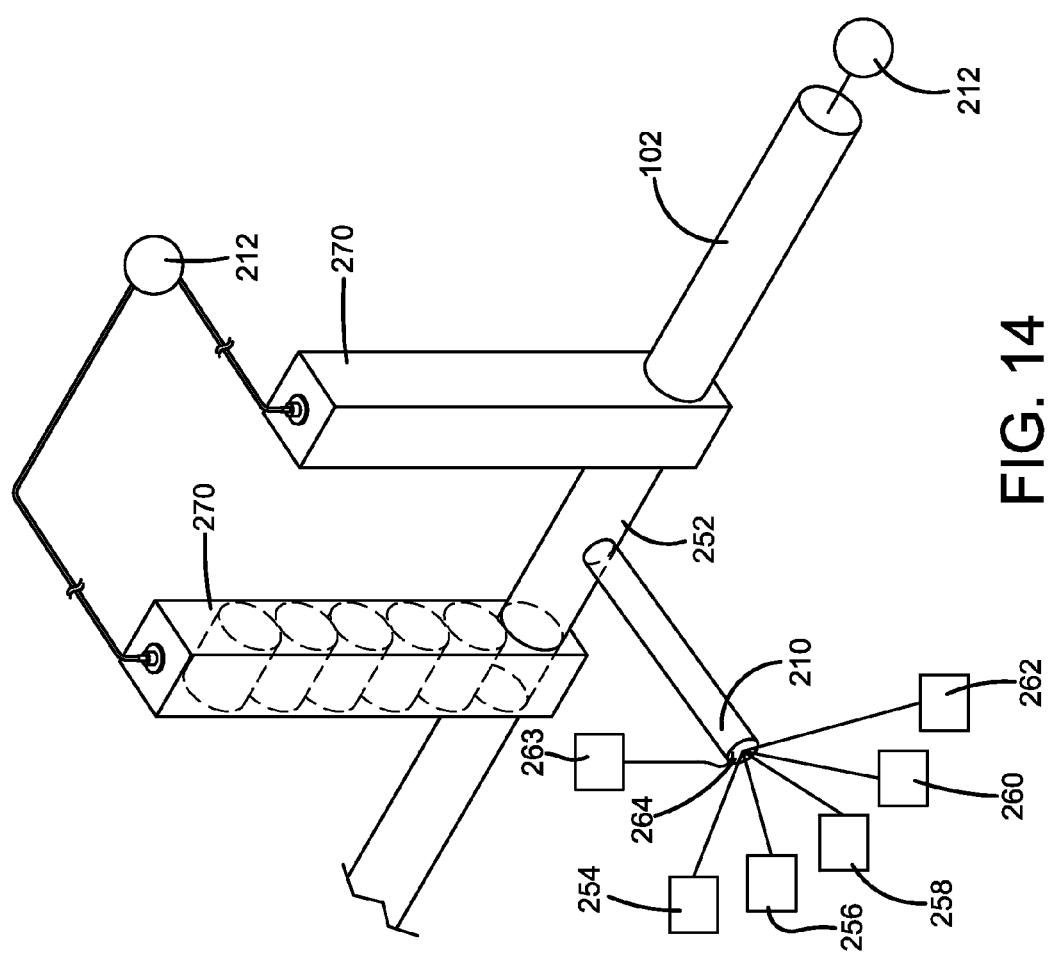
FIG. 14 is a schematic view of a fourth configuration for a pig train loader that is adapted to be used in an automated system.

In the configuration of FIG. 12, a pair of pig carriers 270 are used to sequentially move leading 152 and trailing 154 pig members into alignment with tube section 102. Each pig carrier 270 can hold the multiple pig members that are used to form the pig trains used with the method of the disclosure. These pig carriers 270 are depicted as rotating to load the sequential pig members. Other pig carriers may slide the pig members into position. For example, FIG. 14 depicts a configuration wherein the pig members are slid linearly or rolled into position. In the FIG. 14 configuration, each pig carrier 270 holds a plurality of stacked pig members with the lowermost pig member in each carrier 270 being aligned with tube section 102. The selective application of compressed air from source 212 moves the next set of pig members into alignment when the previously-formed pig train is moved out. When pig carriers 270 are disposed above tube section 102, the pig members can be moved into position with gravity or a combination of compressed air and gravity.

Figure 13:
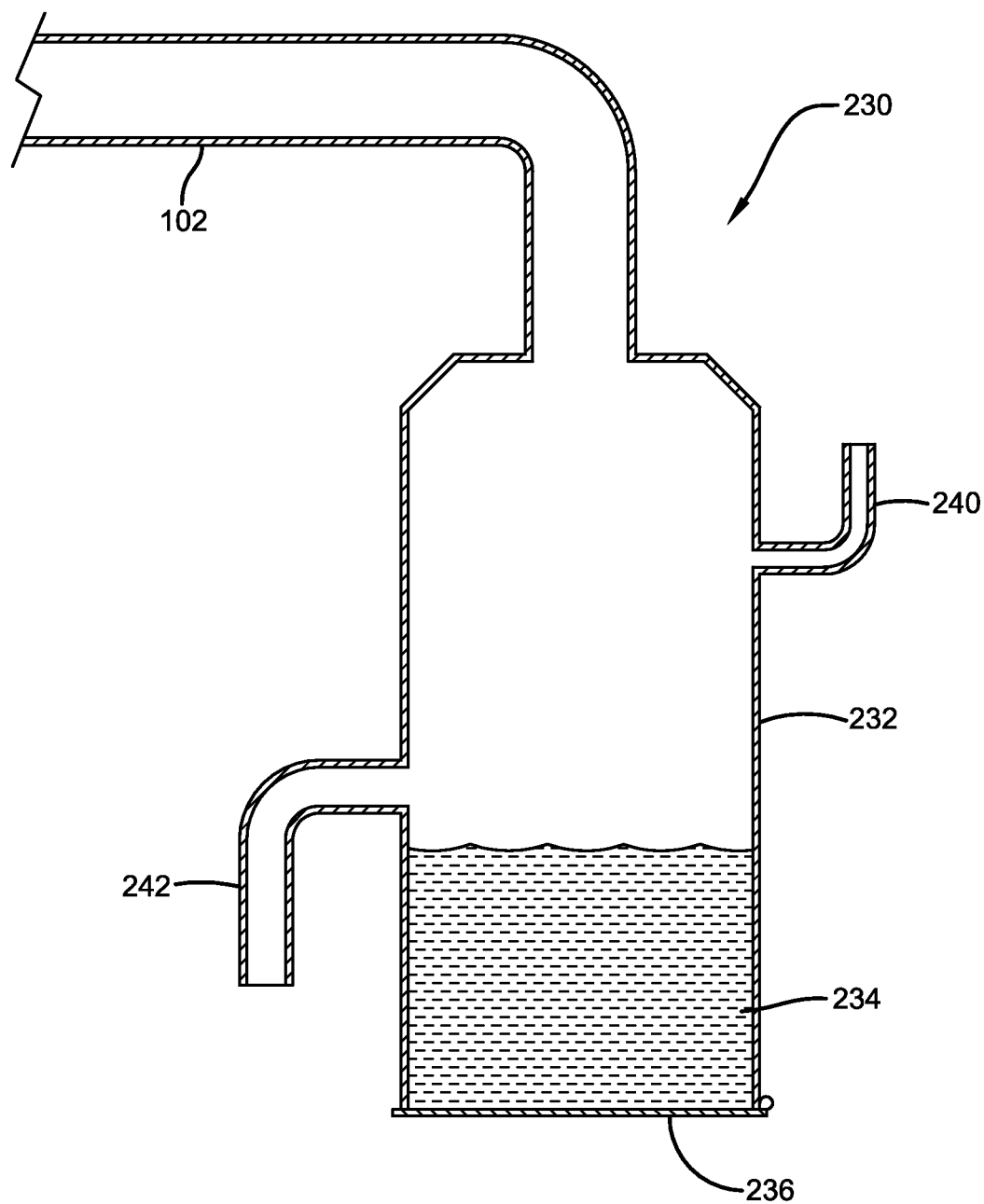
FIG. 13 is a section view of a pig unloader.

Pig trains can be removed from the piping system with an unloader 230 such as the one depicted in FIG. 13. Unloader 230 includes a container 232 having a diameter or dimension larger than the diameter of tube section 102 being cleaned so that the trailing pig member 154 will allow the compressed air behind it to expand and be vented. Water 234 may be provided at the bottom of container 232 to cushion the deceleration of pig members 152 and 154. A hinged door 236 is used to provide access to container 232 to remove pig members 152 and 154.

An upper gas venting outlet 240 is used to allow the pressurized air to escape. A liquid drain 242 is used to drain the liquid materials from the pigs. FIG. 13 is not to scale and vent 240 is disposed high enough above drain 242 so that liquid is not pushed out of vent 240. Vent 240 may be substantially smaller in diameter than tube section 102. Vent 240 may have a one inch diameter for use with a six inch tube section 102. In such a configuration, drain 242 has a four inch diameter and container 232 has an eight inch diameter. The spacing between vent 240 and drain 242 depends on the length of pig.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the above description and attached illustrations are an example and the invention is not limited to the exact details shown or described. Throughout the description and claims of this specification the words "comprise" and "include" as well as variations of those words, such as "comprises," "includes," "comprising," and "including" are not intended to exclude additives, components, integers, or steps.

The invention claimed is:

1. A method of cleaning a section of tubing in a piping system; the method comprising the steps of:
    moving a first pig train through the section of tubing wherein the first pig train includes a mixture of dry ice and glycol disposed between a leading pig member and a trailing pig member.

2. The method of claim 1, further comprising the steps of moving the first pig train at a first velocity through the section or tubing and then slowing the first pig train at a first location along the section of tubing.

3. The method of claim 1, further comprising the steps of moving the first pig train at a first velocity through the section or tubing and then stopping the first pig train at a first location along the section of tubing.

4. The method of claim 3, further comprising the step of moving the pig train back and forth at the first location.

5. The method of claim 1, further comprising the step of moving the pig train with compressed air applied to the trailing pig member.

6. The method of claim 5, further comprising the step of applying compressed air to the leading pig member to compress the dry ice and glycol mixture disposed between the leading and trailing pig members.

7. The method of claim 6, further comprising the step of stopping the pig train when the dry ice and glycol mixture is pressurized.

8. The method of claim 1, further comprising the step of allowing the dry ice to sublimate while the pig train is moving through the section of tubing.

9. The method of claim 1, further comprising the step of moving a second pig train through the section of tubing at least once wherein the second pig train includes water disposed between a leading pig member and a trailing pig member.

10. The method of claim 9, further comprising the step of moving a third pig train through the section of the tubing at least once wherein the third pig train includes a mixture of water and disinfecting material or water and sanitizing material disposed between a leading pig member and a trailing pig member.

11. The method of claim 10, further comprising the step of moving the second pig train through the section of tubing.

12. The method of claim 11, further comprising the step of moving a fourth pig train through the section of tubing wherein the fourth pig train includes a mixture of water and an acid sanitizing solution.

13. The method of claim 12, further comprising the step of forming the first, second, third, and fourth pig trains in an automated pig loader and sequentially loading the pig trains into the piping system.

14. The method of claim 1, further comprising the step of discharging the pig train from the piping system into a pig catcher.

15. The method of claim 14, further comprising the step of venting gas from the pig catcher after the pig train is disposed in the pig catcher.

16. The method of claim 1, further comprising the step of automatically loading the leading and trailing pig members into the piping system during formation of the first pig train.

17. The method of claim 16, further comprising the step of automatically loading the glycol and dry ice between the leading and trailing pig members to form the first pig train.

18. An apparatus used to form a cleaning pig train used to clean a section of tubing in a conveying piping system; the apparatus comprising:
- a first pig carrier that carries at least one leading pig member; the first pig carrier adapted to position the leading pig member in a first position aligned with the section of tubing to be cleaned;
- a second pig carrier that carries at least one trailing pig member; the second pig carrier adapted to position the trailing pig member in a second position aligned with the section of tubing to be cleaned; the second position being spaced from the first position;
- a mixing chamber disposed between the first and second positions;
- the mixing chamber having a loading inlet;
- a supply of dry ice in selective communication with the loading inlet; and
- a supply of glycol in selective communication with the loading inlet.

19. The apparatus of claim 18, further comprising a supply of water in selective communication with the loading inlet.

20. The apparatus of claim 19, further comprising a supply of disinfecting or sanitizing material in selective communication with the loading inlet.

21. An apparatus used to form a cleaning pig train used to clean a section of tubing in a conveying piping system; the apparatus comprising:
- a first pig carrier having a body having an unloading portion that is aligned with a section of tubing where a pig train is formed; the first pig carrier being adapted to carry a plurality of leading pig members;
- a second pig carrier having a body having an unloading portion that is aligned with a section of tubing where a pig train is formed; the second pig carrier being adapted to carry a plurality of trailing pig members;
- the unloading portion of the first pig carrier being spaced from the unloading portion of the second pig carrier along the length of the section of tubing where the pig train is formed;
- a mixing chamber defined by the section of tubing where the pig train is formed between the unloading portion of the first pig carrier and the unloading portion of the second pig carrier;
- the mixing chamber having a loading inlet;
- a supply of dry ice in selective communication with the loading inlet; and
- a supply of glycol in selective communication with the loading inlet.

22. The apparatus of claim 21, further comprising a supply of water in selective communication with the loading inlet.

23. The apparatus of claim 22, further comprising a supply of disinfecting or sanitizing material in selective communication with the loading inlet.

24. The apparatus of claim 21, wherein one of the first and second pig carriers defines a plurality of spaces adapted to carry pig members; the plurality of spaces being disposed along an arc such that the pig carrier rotates to align each space with the section of tubing where the pig train is formed.

25. The apparatus of claim 21, wherein one of the first and second pig carriers defines a plurality of spaces adapted to carry pig members; the plurality of spaces being aligned and joined such that the pig members roll or slide from space to space.

* * * * *